United States Patent
Reynolds et al.

(10) Patent No.: US 9,463,745 B2
(45) Date of Patent: *Oct. 11, 2016

(54) SIDE ENTRY VEHICLE SYSTEMS AND RELATED COMPONENTS

(71) Applicant: Pink Adventure Group, Inc., Houston, TX (US)

(72) Inventors: Joseph Reynolds, Sedona, AZ (US); Greg McCallum, Sedona, AZ (US); Shawn Wendell, Sedona, AZ (US)

(73) Assignee: Pink Adventure Group, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,939

(22) Filed: Sep. 29, 2015

(65) Prior Publication Data

US 2016/0096478 A1     Apr. 7, 2016

Related U.S. Application Data

(63) Continuation of application No. 14/505,485, filed on Oct. 2, 2014, now Pat. No. 9,145,092.

(51) Int. Cl.
*B60R 3/02* (2006.01)
*B60R 3/00* (2006.01)
(Continued)

(52) U.S. Cl.
CPC ............ *B60R 3/00* (2013.01); *B60K 15/07* (2013.01); *B60N 2/01* (2013.01); *B60R 3/002* (2013.01);
(Continued)

(58) Field of Classification Search
USPC ................ 280/756; 296/64, 37.15
See application file for complete search history.

(56) References Cited

U.S. PATENT DOCUMENTS

| 1,392,955 A | 10/1921 | Martin |
| 2,278,450 A | 10/1941 | Jones |

(Continued)

FOREIGN PATENT DOCUMENTS

| DE | 102008057537 A1 | 5/2010 |
| GB | 2306408 A | 5/1997 |
| WO | WO2008099371 A1 | 8/2008 |

OTHER PUBLICATIONS

Spec sheet for Sport 4×4, Sport S 4×4, Sport RHD 4×4, Sahara 4×4, and Rubicon 4×4 models of 2014 Jeep Wrangler Unlimited, published at least as early as Sep. 30, 2014, available online at http://www.jeep.com/model-compare/detailed-chart/?modelYearCode=CUJ201407, last accessed Sep. 30, 2014.

(Continued)

*Primary Examiner* — Nicole Verley
(74) *Attorney, Agent, or Firm* — Adam R. Stephenson, Ltd.

(57) ABSTRACT

A side entry system for a vehicle having at least four doors includes a running board coupled to an exterior surface of the vehicle. A first step is included at or within a door sill of a rear passenger door. The first step is positioned above the running board. A second step is formed adjacent to the first step and is included in an interior of the vehicle. The second step is positioned above the first step. The running board, the first step, and the second step are configured to assist standing entry into a passenger pod of the vehicle through the rear passenger door. A roll cage is coupled to the vehicle and is attached to a rear bumper of the vehicle. The passenger pod extends aft of a rear taillight of the vehicle and includes a passenger seat positioned at least mostly aft of the rear taillight.

20 Claims, 6 Drawing Sheets

(51) Int. Cl.
  *B60K 15/07* (2006.01)
  *B60N 2/01* (2006.01)
  *B60R 7/04* (2006.01)
  *B60R 21/13* (2006.01)
  *B62D 25/20* (2006.01)
  *B62D 47/00* (2006.01)
  *B60R 9/02* (2006.01)

(52) U.S. Cl.
  CPC ............... *B60R 3/02* (2013.01); *B60R 7/043* (2013.01); *B60R 9/02* (2013.01); *B60R 21/13* (2013.01); *B62D 25/20* (2013.01); *B62D 47/00* (2013.01)

(56) References Cited

U.S. PATENT DOCUMENTS

| | | | |
|---|---|---|---|
| 2,324,508 A | 3/1942 | Johnson |
| 2,535,242 A | 12/1950 | Stuart |
| 2,665,165 A | 1/1954 | Pitman |
| 3,009,212 A | 11/1961 | Makens |
| 3,184,766 A | 5/1965 | Mortrude |
| 3,392,798 A | 7/1968 | Sipe |
| 3,455,597 A | 7/1969 | Sherbert |
| 4,319,777 A | 3/1982 | Law |
| 5,228,707 A | 7/1993 | Yoder |
| 5,615,922 A | 4/1997 | Blanchard |
| 5,868,412 A | 2/1999 | Hinkle |
| 5,947,541 A | 9/1999 | Behrens et al. |
| 6,460,915 B1 | 10/2002 | Bedi et al. |
| 6,588,783 B2 | 7/2003 | Fichter |
| 6,685,204 B1 | 2/2004 | Hehr |
| 6,908,107 B2 | 6/2005 | Barth |
| 7,004,486 B1 | 2/2006 | Farkash |
| 7,086,689 B2 | 8/2006 | Dean |
| 7,171,908 B2 | 2/2007 | Lamarche |
| 7,287,770 B2 | 10/2007 | Drabant et al. |
| 7,318,616 B1 | 1/2008 | Bradley |
| 7,325,860 B2 | 2/2008 | Day |
| 7,338,112 B2 | 3/2008 | Gilliland et al. |
| 7,464,963 B2 | 12/2008 | Hepner et al. |
| 7,513,520 B2 | 4/2009 | Okuyama |
| 7,637,563 B2 | 12/2009 | Plett et al. |
| 7,673,892 B2 | 3/2010 | Kuntze et al. |
| 7,731,212 B2 | 6/2010 | Storer |
| 8,210,582 B2 | 7/2012 | Parfut et al. |
| 8,366,129 B2 | 2/2013 | Salmon et al. |
| 8,408,347 B2 | 4/2013 | Chapman |
| 8,827,294 B1 | 9/2014 | Leitner et al. |
| 8,864,174 B2 | 10/2014 | Minami et al. |
| 8,899,620 B1 | 12/2014 | Bhardwaj et al. |
| 8,899,659 B2 | 12/2014 | Angelo |
| 8,944,465 B2 | 2/2015 | Shinbori |
| 2008/0238020 A1 | 10/2008 | Okada et al. |
| 2009/0179450 A1 | 7/2009 | Brown et al. |
| 2010/0181741 A1 | 7/2010 | Webb |
| 2010/0194070 A1 | 8/2010 | Stauffer et al. |
| 2012/0056411 A1 | 3/2012 | Nakamura et al. |
| 2014/0167379 A1 | 6/2014 | Kibler |
| 2014/0217790 A1 | 8/2014 | Stavros |
| 2014/0239609 A1 | 8/2014 | Robertson |
| 2014/0333042 A1 | 11/2014 | Cha et al. |
| 2014/0353956 A1 | 12/2014 | Bjerketvedt et al. |
| 2015/0042060 A1 | 2/2015 | Cha et al. |
| 2015/0060205 A1 | 3/2015 | Blackwell et al. |
| 2015/0102591 A1 | 4/2015 | Perez De Larraya Sagues |

OTHER PUBLICATIONS

Spec sheet for Sport 4×4, Sport S 4×4, Willys Wheeler 4×4, Willys Wheeler W 4×4, Sahara 4×4, Rubicon 4×4, and Rubicon Hard Rock 4×4 models of 2015 Jeep Wrangler Unlimited, published at least as early as Sep. 30, 2014, available online at http://www.jeep.com/model-compare/detailed-chart/?modelYearCode=CUJ201507, last accessed Sep. 30, 2014.

Photographs of rear entry and other elements of a vehicle, photographed Aug. 29, 2014, and used for tours with the public at least as early as that date.

SIDE ENTRY VEHICLE SYSTEMS AND RELATED COMPONENTS

CROSS REFERENCE TO RELATED APPLICATIONS

This application is a continuation application of the earlier U.S. Utility Patent Application to Reynolds et al., entitled "Side Entry Vehicle Systems and Related Components," application Ser. No. 14/505,485, filed Oct. 2, 2014, which issued as U.S. Pat. No. 9,145,092 on Sep. 29, 2015, the disclosure of which is hereby incorporated entirely herein by reference.

BACKGROUND

1. Technical Field

Aspects of this document relate generally to entry and other components for vehicles. More specific implementations involve side entry components for four-by-four off-road sport utility vehicles (SUVs).

2. Background Art

Many vehicles have a rear passenger section, usually aft of a front driver's seat and a front passenger seat. Some vehicles with rear passenger sections do not have a rear passenger side entry door, but have a front driver's side door and a front passenger side door. In such vehicles the rear passenger section is generally made accessible by temporarily moving the back of the front driver seat or front passenger seat forward so that passengers may enter the rear passenger section behind the collapsed and folded down seat.

SUMMARY

Implementations of a side entry system for a vehicle having at least four doors may include: a running board coupled to an exterior surface of the vehicle; a first step of at or within a door sill of a rear passenger door, the first step positioned above the running board; and a second step formed adjacent to the first step and included in an interior of the vehicle, the second step positioned above the first step; wherein the running board, the first step, and the second step are configured to assist standing entry into a passenger pod of the vehicle through the rear passenger door.

Implementations of a side entry system for a vehicle having at least four doors may include one, all, or any of the following:

A roll cage may be coupled to the vehicle.

A rear bumper may be coupled to a rear of the vehicle, and the roll cage may be coupled to the rear bumper.

The passenger pod may extend aft of a rear taillight of the vehicle, the passenger pod having a passenger seat positioned at least mostly aft of the rear taillight.

The passenger pod may include a storage compartment positioned below a passenger seat of the passenger pod and the storage compartment may be accessible using an access door coupled on the exterior of the vehicle.

An adjustable step may be included, movable between a storage position below the running board and an in-use position, wherein the adjustable step when in the in-use position forms a third step positioned below the running board and configured to assist standing entry by a passenger into the passenger pod through the rear passenger door.

The first step may be included in a first level of a second floor positioned above a first floor of the interior of the vehicle and the second step may be included in a second level of the second floor. The second level may form a largest floor section of the interior of the vehicle.

A substantially vertical divider may be included, and may be at least one inch in height above a second level of a second floor of the interior of the vehicle. The substantially vertical divider may divide a floor of the passenger pod from a floor of a driver section of the vehicle.

A passenger seat of the passenger pod may be included and may be positioned directly above a wheel well of the vehicle.

The side entry system may include a substantially vertical panel positioned directly below a passenger seat of the passenger pod and at least partially hiding a wheel well of the vehicle.

The vehicle may be configured with sufficient seat space to simultaneously seat eight adult passengers and one adult driver.

The vehicle may include no passenger entry door at the rear of the vehicle.

The vehicle may be a four-by-four off-road sport utility vehicle (SUV) having a ground clearance of 10.25 inches at a rear axle and 18 inches at a fuel tank measured when the vehicle includes no cargo and no passengers.

The vehicle may be a four-by-four off-road sport utility vehicle (SUV) having a wheel base of 114.75 inches and an axle track of 69 inches.

The side entry system may include a seat back frame positioned within four inches of a seat back of each of a plurality of passenger seats in the passenger pod of the vehicle.

The rear passenger door may be a half door.

Implementations of a side entry system for a vehicle may include: a running board coupled to an exterior of a four-wheel drive off-road sport utility vehicle (SUV), the SUV having at least four doors; a roll cage coupled to the SUV; a rear bumper coupled to a rear of the SUV, where the rear bumper is coupled directly to the roll cage; a first step at or within a door sill of a rear passenger door, the first step positioned above the running board, and; a second step formed adjacent to the first step and included in an interior of the SUV, the second step positioned above the first step; wherein the first step is included in a first level of a second floor positioned above a first floor of the interior of the SUV and the second step is included in a second level of the second floor, the second level forming a largest floor section of the interior of the SUV; wherein the running board, the first step, and the second step are configured to allow standing entry into the SUV by an adult passenger through the rear passenger door; and wherein the SUV includes sufficient seat space configured to simultaneously seat at least nine adults.

Implementations of a side entry system for a vehicle may include one, all, or any of the following:

The side entry system may include an adjustable step movable between a storage position below the running board and an in-use position, wherein the adjustable step when in the in-use position forms a third step positioned below the running board which is configured to assist an adult passenger make standing entry into the SUV through the rear passenger door.

Implementations of a side entry system for a vehicle may include: a first step proximate a rear passenger door of a vehicle; a second step included in an interior of the vehicle, the second step positioned above the first step; a rear bumper coupled to a rear of the vehicle; and a roll cage coupled to the vehicle and coupled directly to the rear bumper; wherein the first step and the second step are configured to assist standing entry by an adult passenger into a passenger pod of the vehicle through the rear passenger door.

Implementations of a side entry system for a vehicle may include one, all, or any of the following:

The vehicle may be a four-wheel drive off-road sport utility vehicle (SUV) having at least four doors and having a ground clearance of 10.25 inches at a rear axle and 18 inches at a fuel tank when measured with no cargo and with no passengers.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
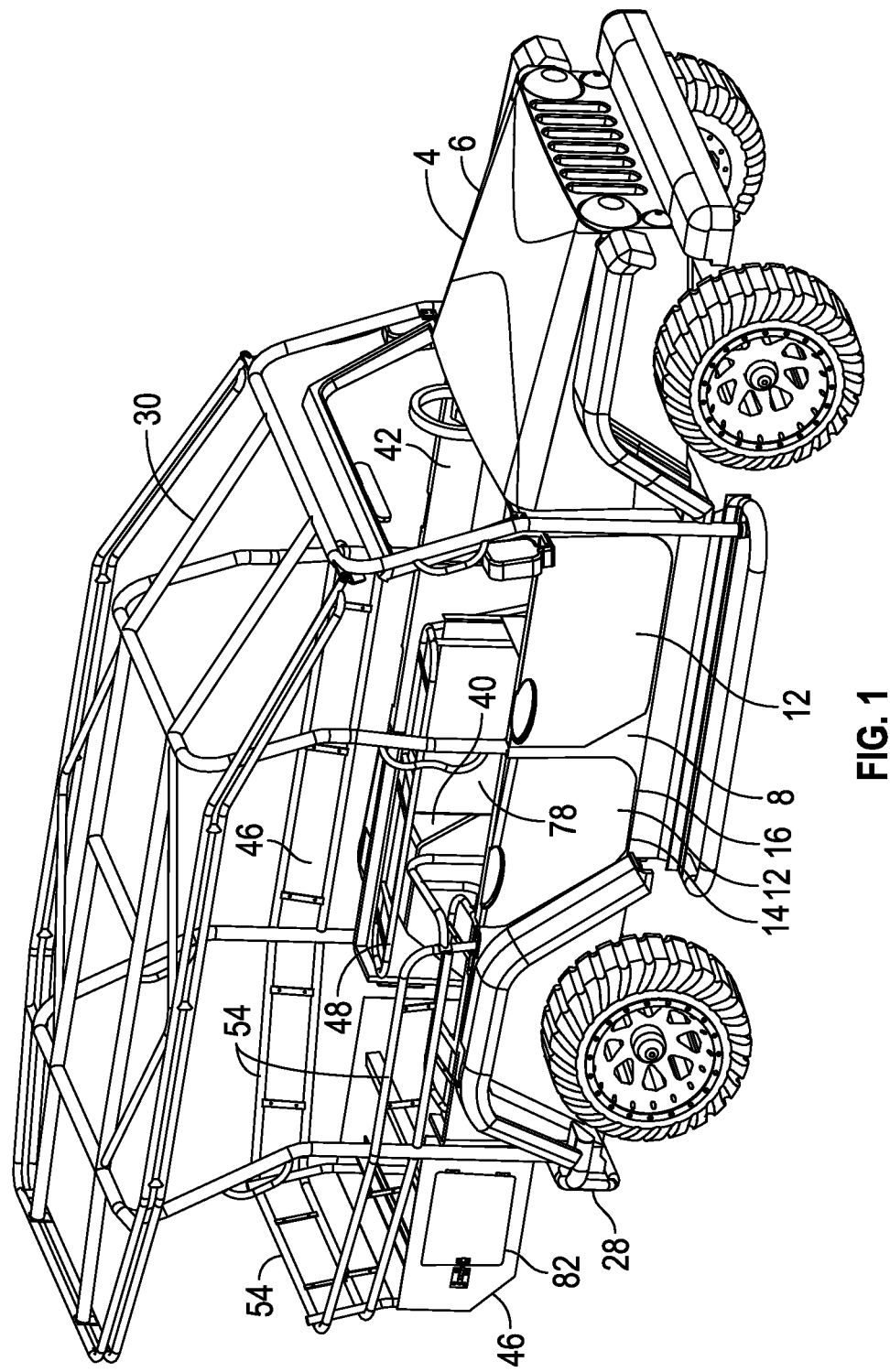
FIG. 1 is a perspective view of an implementation of a vehicle illustrating an implementation of a side entry system.

This disclosure, its aspects and implementations, are not limited to the specific components, assembly procedures or method elements disclosed herein. Many additional components, assembly procedures and/or method elements known in the art consistent with the intended side entry vehicle components and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such side entry vehicle components and related methods, and implementing components and methods, consistent with the intended operation and methods.

Referring now to FIGS. 1-8, an implementation of a vehicle 4 is shown which may be used for implementing a side entry system 2. The vehicle 4 is a four-wheel drive off-road sport utility vehicle (SUV) 6. SUV 6 in the implementation illustrated is a vehicle sold under the trade name JEEP WRANGLER UNLIMITED by Chrysler Group LLC of Auburn Hills, Mich. and modified from its stock configuration in certain ways. For example, the ground clearance has been increased to be about 10.25 inches at a rear axle and about 18 inches at a fuel tank of the vehicle 4, when measured with no cargo and no passengers. Additionally, the wheel base of the vehicle 4 has been modified to be about 114.75 inches and the axle track of the final version is about 69 inches. In various implementations disclosed herein an SUV 6 may be utilized for the side entry system 2 but with different clearances, wheel base and axle track measurements. Also, in particular implementations, the SUV 6 could be a vehicle other than a JEEP WRANGLER UNLIMITED.

The vehicle 4 in particular implementations may be any of the following vehicle models of the JEEP WRANGLER UNLIMITED sold by Chrysler Group LLC: a SPORT 4×4, SPORT S 4×4, SPORT RHD 4×4, SAHARA 4×4, or RUBICON 4×4 model of the 2014 JEEP WRANGLER UNLIMITED, or a SPORT 4×4, SPORT S 4×4, WILLYS WHEELER 4×4, WILLYS WHEELER W 4×4, SAHARA 4×4, RUBICON 4×4, or RUBICON HARD ROCK 4×4 model of the 2015 JEEP WRANGLER UNLIMITED. Other current or future SUV models by the same or other providers may be used at include three or more doors.

The vehicle 4 in various implementations has at least four doors 12 and one of these doors 12 is a rear passenger door 14. In other implementations the vehicle 4 could have only three doors 12 provided that at least one of the doors 12 is a rear passenger door 14. The rear passenger door 14 is located on a side of the vehicle 4 and not at or on a rear 24 of the vehicle 4. In some implementations, as those illustrated, there is no passenger entry door at the rear 24 of the vehicle 4. As illustrated, the rear passenger door 14 is located on a side of the vehicle 4 opposite the driver side of the vehicle 4, though the rear passenger door 14 and, accordingly, the side entry system 2, could in other implementations be on the same side of the vehicle 4 corresponding with the driver side. This is particularly true where the vehicle 4 is configured to have the driver's side on either the left or right side of the vehicle, depending upon the side of the road (right or left) on which the vehicle is driven in a particular country.

Figure 3:
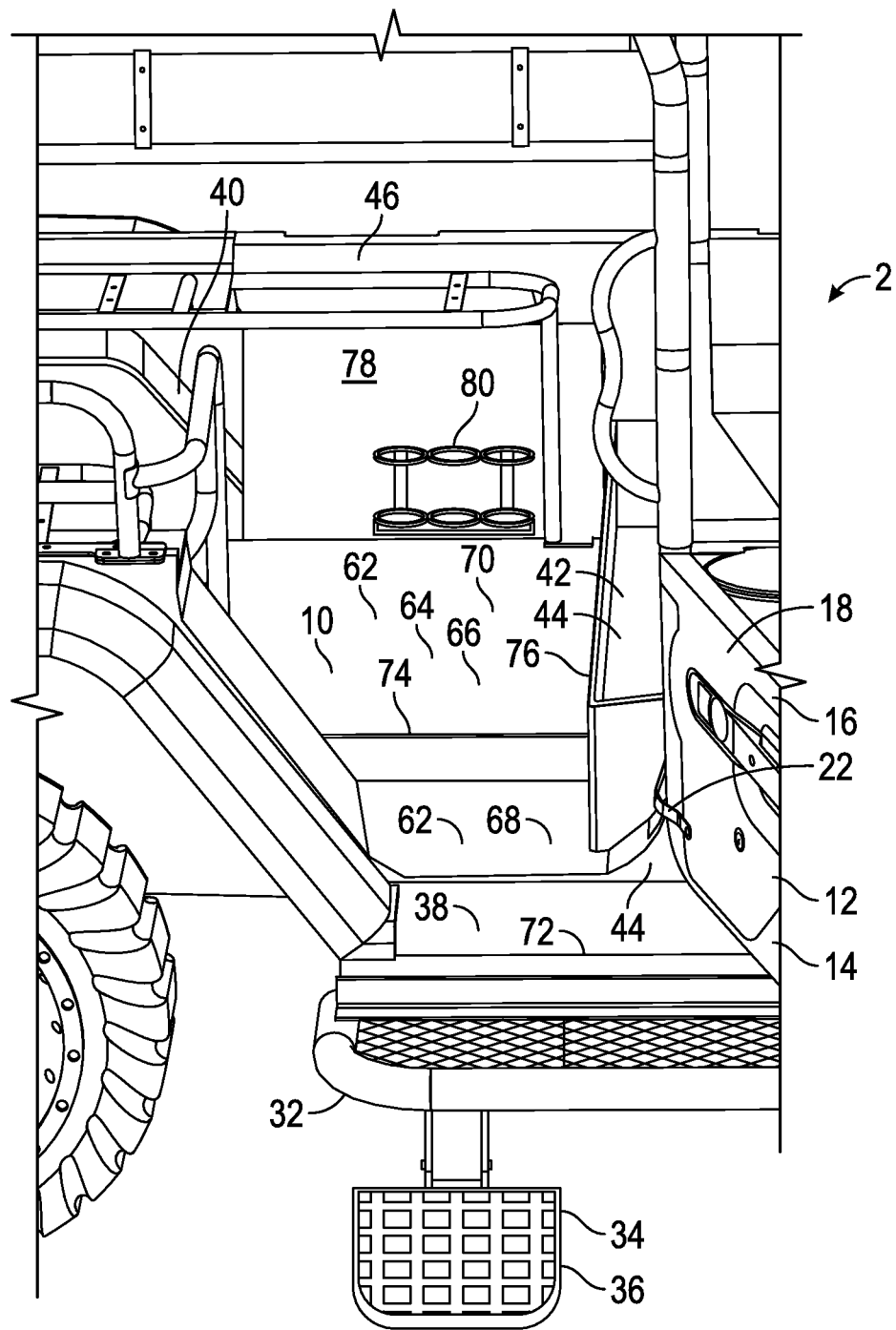
FIG. 3 is a front view of an implementation of a side entry system.
Figure 6:
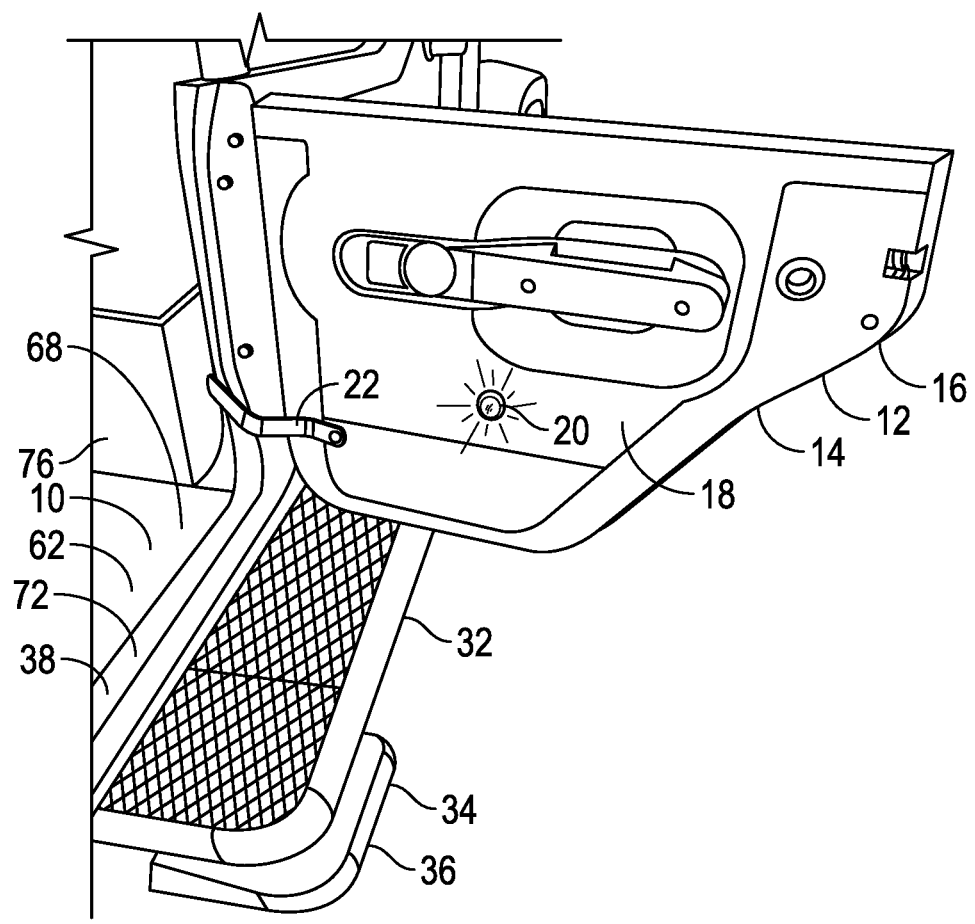
FIG. 6 is a rear view of an implementation of a side entry system.
Figure 7:
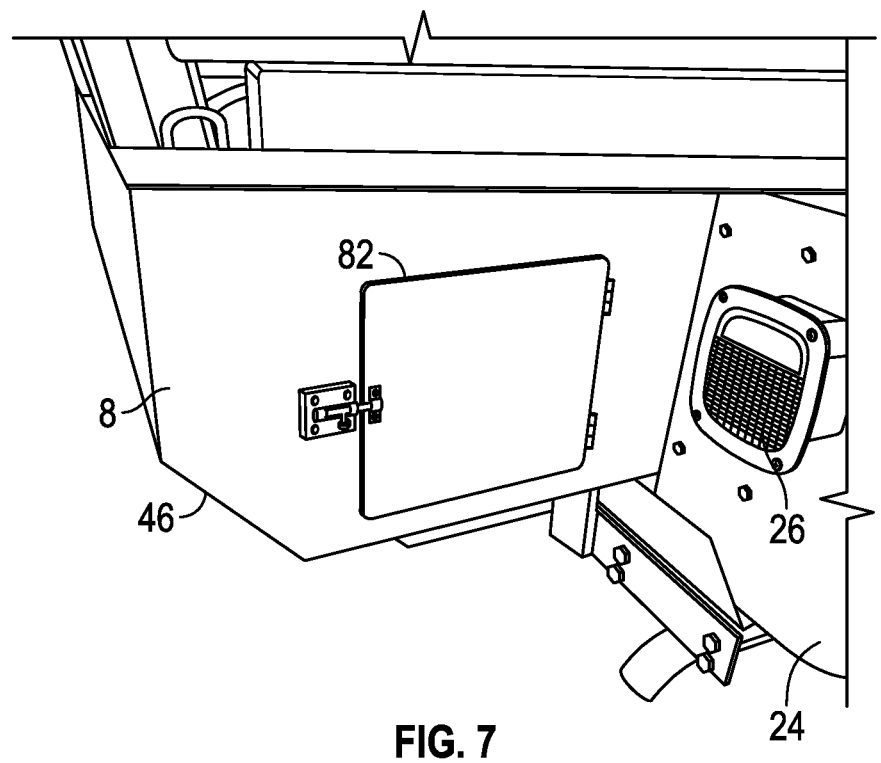
FIG. 7 is a side view of a closed storage compartment of the vehicle of FIG. 1.
Figure 8:
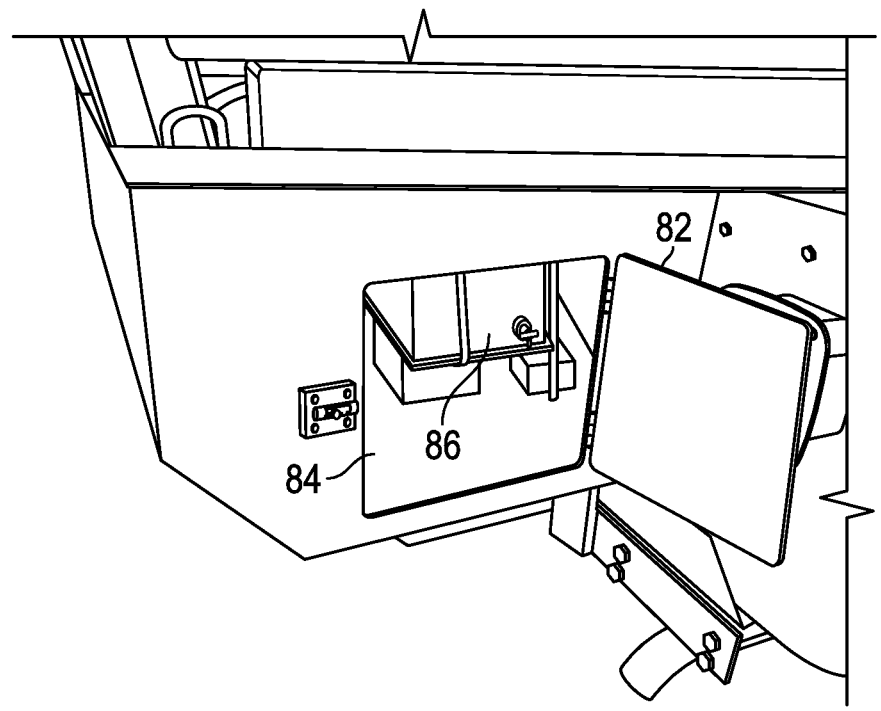
FIG. 8 is a side view of the storage compartment of FIG. 7 in the open configuration.

The rear passenger door 14 shown in some implementations will be a half door 16 that is vertically hinged to the vehicle 4, which is the door type illustrated in the drawings. In implementations a different type of door could be used together with the side entry system 2 such as, by non-limiting example, a sliding door, a full door, and a door having a transparent glass or polymer window therein or coupled thereto. Referring to FIGS. 3 and 6, a cable 22 provides electricity to a light 20 that is located on an internal side 18 of the rear passenger door 14. The light 20 is positioned and configured to illuminate the side entry system 2. The cable 22 also may serve as a stop for the rear passenger door 14 to prevent it from opening beyond a desired stopping point.

Figure 2:
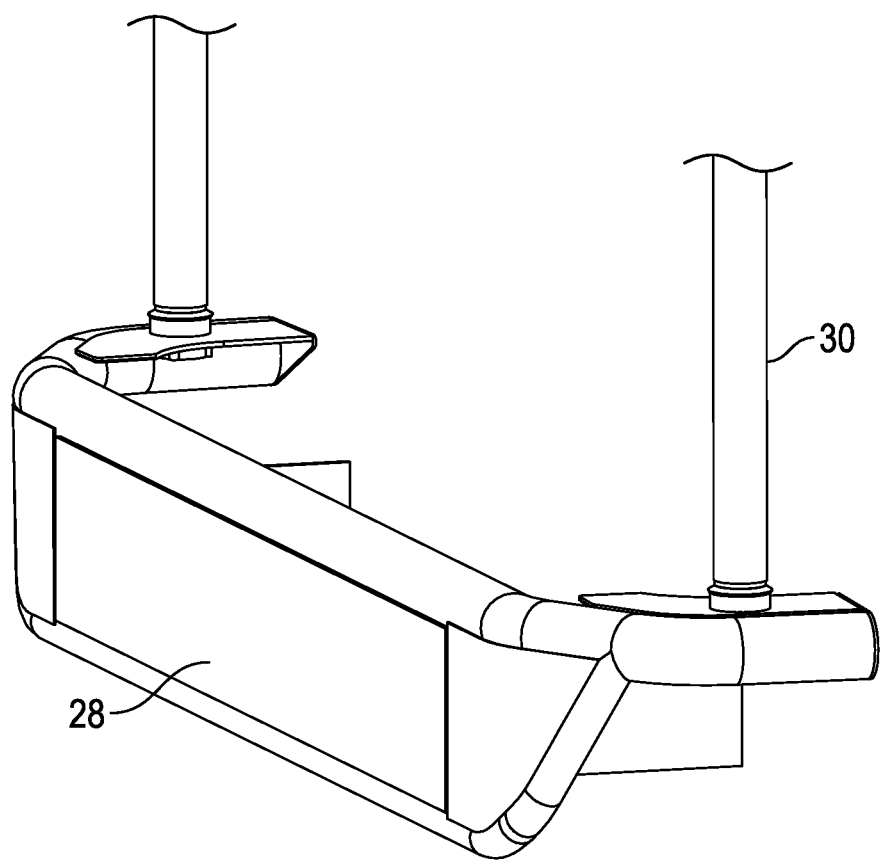
FIG. 2 is a perspective view of a rear bumper and roll cage implementation of the vehicle of FIG. 1.

The vehicle 4 has an exterior 8 and an interior 10, and the doors 12 open to allow a passenger to enter the interior 10 of the vehicle 4 and to allow a passenger to exit the interior 10. A roll cage 30 is attached to the vehicle 4 to protect occupants of the vehicle 4 in case the vehicle 4 tips or rolls during operation. A rear bumper 28 is coupled to a rear 24 of the vehicle 4 and a rear taillight 26 is also attached to the rear 24 of the vehicle 4. The roll cage 30 is coupled directly to the rear bumper 28 rather than to the rear portion of the vehicle body, as shown in FIG. 2, to provide additional stability and security to the vehicle 4 in case the vehicle 4 tips or rolls over. This aspect of the roll cage 30 and rear bumper 28 is in contrast with conventional SUV roll cages which couple only to the vehicle body. This capability enables the roll cage to extend fully over the seating the vehicle, including a passenger pod 46 included in the vehicle 4.

Figure 5:
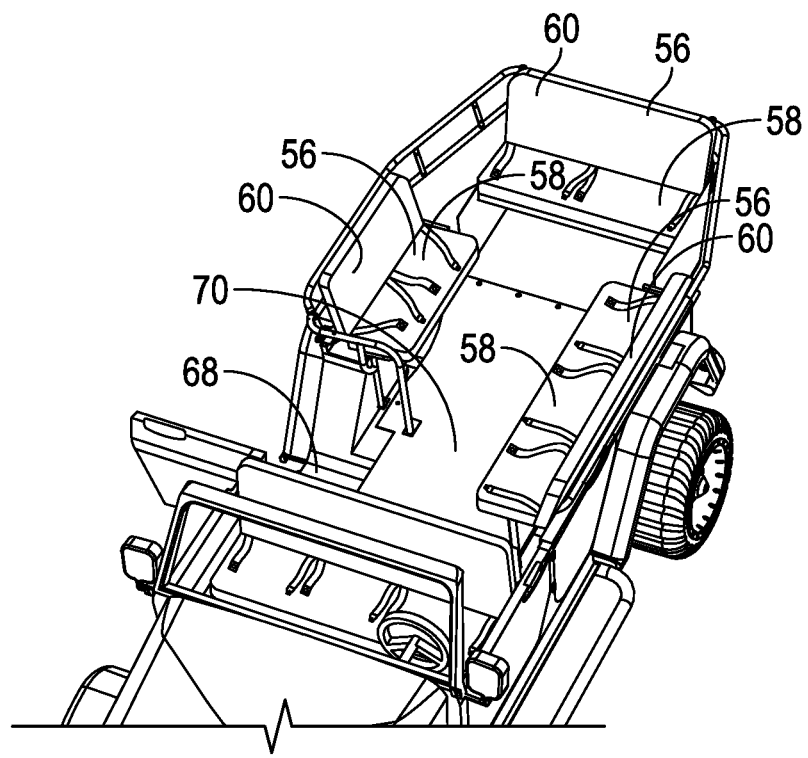
FIG. 5 is a top view of an implementation of a side entry system.

The vehicle 4 includes a driver section 42, which includes the driver's seat and at least one passenger's seat next to the driver on an opposing side of the vehicle. The passenger pod 46 is also included and has seating for at least seven passengers. Accordingly the vehicle 4 includes seating for at least nine adults, including eight adult passengers and one adult driver. Each seat location may include at least one lap seatbelt as depicted in FIG. 5.

Referring now to FIG. 3, a side entry system 2 for the vehicle 4 is shown. A running board 32 is coupled to the exterior 8 of the vehicle 4 that aids passengers to enter the vehicle 4. A first step 72 is located at or within a sill 38 of the vehicle 4 and is accessible upon opening the rear passenger door 14. The first step 72 is configured to assist a passenger's entering the vehicle 4 and is positioned above the running board 32. A second step 74 is located in the interior 10 of the vehicle 4 adjacent to and above the first step 72, the second step 74 assisting the passenger's full entry into the vehicle 4 and the passenger pod 46.

The second step 74 is formed in a second floor 62 that is positioned above a first floor 44 of the vehicle 4. The first floor 44 in implementations is an original floor of the vehicle's body and the second floor 62 is an additional surface that installed above the original floor. The second floor 62 has a first level 68 and, above the first level 68, a second level 70. The first step 72 is flush with, or is substantially flush with, the first level 68, and thus brings a passenger to the first level 68 when a passenger uses the first step 72. The second step 74 is flush with, or is substantially flush with, the second level 70, and thus brings a passenger to the second level 70 when a passenger uses the second step 74. The second floor 62 forms a largest floor section 64 of the vehicle 4. The largest floor section 64 is parallel with, or is substantially parallel with, the first floor 44. The first floor 44 corresponds with approximately the level of the driver section 42 of the vehicle 4 while the second floor 62 corresponds with and forms the floor of the passenger pod 46. In implementations the second floor 62 and/or the second level 70 of the second floor 62 is formed with a raised panel 66. The second floor 62 in implementations is formed of metal, such as steel, and/or includes steel segments or portions that are welded and/or otherwise joined together. Various support brackets, fasteners, and related structures (not show in the drawings) are used to couple and attach the second floor to the original floor of the vehicle, and to provide support for the first step 72 and the second step 74.

Referring to FIGS. 3 and 6, a substantially vertical divider 76 separates the passenger pod 46 from the driver section 42. The substantially vertical divider 76 may be formed of the same material as the second floor 62, such as a metal and may be welded or otherwise joined (bolted, fastened, etc.) to the second floor 62 or to the first floor 44. The substantially vertical divider 76 provides a barrier to prevent items such as water, mud, water bottles, backpacks, food items, and other items in the passenger pod 46 from rolling, sliding or otherwise shifting into the driver section 42 during movement of the vehicle 4, such as while driving over rough terrain. The substantially vertical divider 76 also prevents items from moving from the driver section 42 to the passenger pod 46. The substantially vertical divider 76 may facilitate cleaning of the passenger pod 46 through hosing down the passenger pod 46 as the substantially vertical divider 76 may allow the water and/or mud and debris to flow out the vehicle 4 (such as out the rear passenger door 14) without entering the driver section 42. In implementations the substantially vertical divider 76 may be a fully vertical divider and in implementations it may have a height of, or of about, or at least, one inch, two inches, three inches, four inches, five inches, six inches, seven inches, eight inches, or one foot.

In particular system implementations a third step 34 is provided. The third step 34 in various implementations is an adjustable step 36 which collapses to a non-use or storage position below the running board 32 and expands to an in-use position below the running board 32. The running board 32 is positioned above the third step 34. In other implementations a third step 34 could be a non-adjustable or otherwise fixed step or a step that is not fixed to the running board 32 or other vehicle, but is portable. The third step 34 assists a passenger's entry into the vehicle 4 by providing a first surface for the passenger to step up on during entry of the vehicle. The third step 34, running board 32, first step 72 and second step 74 are sized and arranged to allow a passenger to make a standing entry into the passenger pod 46 of the vehicle 4 through the rear passenger door 14. This is accomplished as the passenger first steps up on the third step, then onto the running board 32, the first step 72, and finally onto the second step 74. Once the passenger has fully ascended the second step 74, the passenger is now able to walk to a seat in the passenger pod 46. Because the body of the vehicle is open and covered by the roll cage 30, passengers are able to walk directly up into the vehicle using the running board 32, first step 72, and the second step 74 (and in particular implementations, the third step 34) through the rear passenger door 14.

Figure 4:
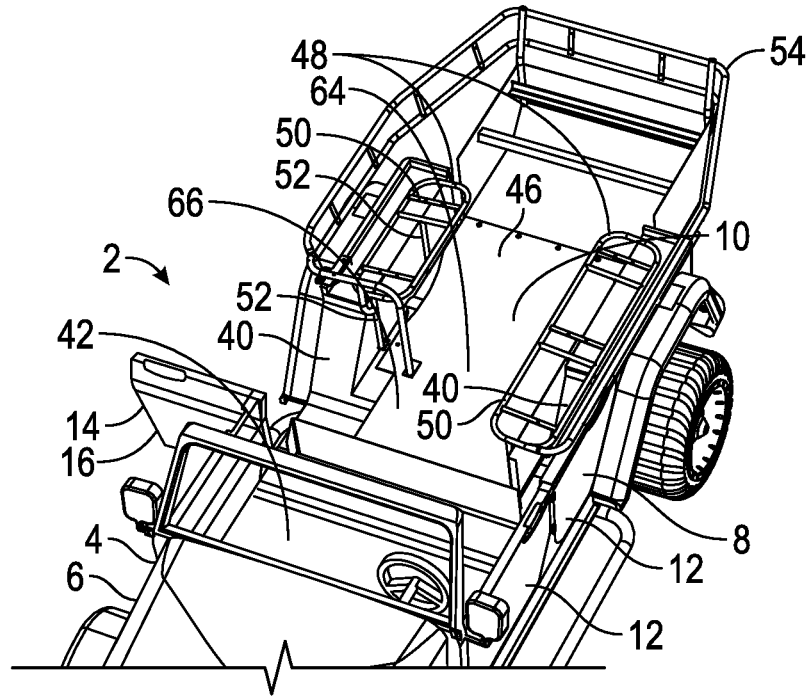
FIG. 4 is a top view of an implementation of a side entry system.

Referring to FIGS. 4 and 5, a plurality of seat frames 48 are provided in the passenger pod 46, each seat frame 48 including a plurality of horizontal members 50 configured to hold or support a seat bottom 58 and a plurality of vertical members 52 configured to couple to or support the horizontal members 50 and to attach to the second floor 62. A plurality of passenger seats 56 are included in the passenger pod 46, each passenger seat 56 being formed using the seat frame 48. Each passenger seat 56 includes, in addition to a seat bottom 58, a seat back 60. A seat back frame 54 sits behind the seat backs 60 of the plurality of passenger seats 56 and extends along the sides and along the back of the passenger pod 46, and along the sides and along the back of the vehicle 4. The seat back frame 54 in implementations is positioned within one of the following distances from a seat back 60 of each passenger seat 56 of the passenger pod 46: less than one inch; one inch; two inches; three inches; four inches; five inches; six inches; seven inches; eight inches; or one foot. In system implementations, the driver's seat, the passenger seat directly to the side of the driver's seat, and the driver section 42 do not form any part of the passenger pod 46. As may be seen from FIGS. 1 and 3-5, in particular implementations, there are two passenger seats 56, on either side of the interior 10 and within the passenger pod 46, which are each positioned directly above a wheel well 40 of the vehicle 4.

A substantially vertical panel 78 within the passenger pod 46 is coupled to a side of the interior 10 of the vehicle 4 and at least partially hides one wheel well 40. The substantially vertical panel 78 in implementations may be fully vertical, and in implementations, as shown in the drawings, it is positioned directly below a passenger seat 56. In implementations a beverage holder 80 is attached to or is otherwise coupled to the substantially vertical panel 78. The substantially vertical panel 78 may also serve to form an edge of the second floor 62 and prevent objects from falling down into the space between the edge of the vehicle and the second floor 62.

In particular implementations, a storage compartment 84 is provided below one of the passenger seats 56 of the passenger pod 46 (the rearmost passenger seat 56, in the implementations shown in the drawings). The storage compartment 84 is accessed using an access door 82 provided on the exterior 8 of the vehicle 4 and is opened via a latching or other closure mechanism. A removable water storage unit 86 may be stored within the storage compartment 84 such as to provide fresh drinking water (or drinking water refills) to passengers during a tour or other outing.

As can be seen in the drawings, a portion of the passenger pod 46 extends aft of the rear taillight 26 of the vehicle 4 and aft of the rear 24 of the vehicle 4 (including the rear bumper) and includes a passenger seat 56 positioned at least mostly aft of the rear taillight 26. In implementations the passenger pod 46 includes a passenger seat 56 (the rearmost passenger seat 56 in the implementations shown in the drawings) that is positioned entirely aft of the rear taillight 26.

One of the basic and novel characteristics of implementations of a side entry system 2 is its facilitation of a passenger's standing entry into a rear passenger door 14 of an SUV 6 allowing the passenger to be substantially fully standing before, during and after the entry process, or in other words, without requiring the passenger to hunch or bend down during entry into the vehicle 4. Such a system also does not require the passenger to maneuver around a rear passenger chair of any kind present in the passenger's path into the SUV 6. Also, such a system does not require the passenger to have to enter the vehicle 4 behind a collapsed/folded down passenger side front seat, which is in contrast to conventional entry systems involving SUV's.

In places where the description above refers to particular implementations of side entry vehicle components and related methods, and implementing components, sub-components, methods and sub-methods, it should be readily apparent that a number of modifications may be made without departing from the spirit thereof and that these implementations, implementing components, sub-components, methods and sub-methods may be applied to other side entry vehicle components and related methods.

What is claimed is:

1. A side entry system for a vehicle, comprising:
   a running board coupled to an exterior surface of the vehicle;
   a first step one of at and within a door sill of a rear passenger door, the first step positioned above the running board; and
   a second step formed adjacent to the first step and comprised in an interior of the vehicle, the second step positioned above the first step;
   wherein the running board, the first step, and the second step are configured to assist standing entry into the vehicle through the rear passenger door.

2. The side entry system of claim 1, wherein the vehicle further comprises a roll cage coupled to the vehicle.

3. The side entry system of claim 2, further comprising a rear bumper coupled to a rear of the vehicle, wherein the roll cage is coupled to the rear bumper.

4. The side entry system of claim 1, wherein a passenger pod extends aft of a rear taillight of the vehicle, the passenger pod comprising a passenger seat positioned at least mostly aft of the rear taillight.

5. The side entry system of claim 4, wherein the passenger pod comprises a storage compartment positioned below a passenger seat of the passenger pod and accessible using an access door coupled on the exterior of the vehicle.

6. The side entry system of claim 1, further comprising an adjustable step movable between a storage position below the running board and an in-use position, wherein the adjustable step when in the in-use position comprises a third step positioned below the running board and configured to assist standing entry by a passenger into a passenger pod through the rear passenger door.

7. The side entry system of claim 1, wherein the first step is comprised in a first level of a second floor positioned above a first floor of the interior of the vehicle and the second step is comprised in a second level of the second floor, the second level being a largest floor section of the interior of the vehicle.

8. The side entry system of claim 1, further comprising a substantially vertical divider at least one inch in height above a second level of a second floor of the interior of the vehicle wherein the substantially vertical divider divides a floor of a passenger pod from a floor of a driver section of the vehicle.

9. The side entry system of claim 1, further comprising a passenger seat of a passenger pod positioned directly above a wheel well of the vehicle.

10. The side entry system of claim 1, further comprising a substantially vertical panel positioned directly below a passenger seat of a passenger pod and at least partially hiding a wheel well of the vehicle.

11. The side entry system of claim 1, wherein the vehicle is configured with sufficient seat space to simultaneously seat eight adult passengers and one adult driver.

12. The side entry system of claim 1, wherein the vehicle comprises no passenger entry door at the rear of the vehicle.

13. The side entry system of claim 1, wherein the vehicle comprises a four-by-four off-road sport utility vehicle (SUV) having a ground clearance of 10.25 inches at a rear axle and 18 inches at a fuel tank measured when the vehicle includes no cargo and no passengers.

14. The side entry system of claim 1, wherein the vehicle comprises a four-by-four off-road sport utility vehicle (SUV) having a wheel base of 114.75 inches and an axle track of 69 inches.

15. The side entry system of claim 1, further comprising a seat back frame positioned within four inches of a seat back of each of a plurality of passenger seats comprised in a passenger pod of the vehicle.

16. The side entry system of claim 1, wherein the rear passenger door comprises a half door.

17. A side entry system for a vehicle, comprising:
    a running board coupled to an exterior of a sport utility vehicle (SUV);
    a first step one of at and within a door sill of a rear passenger door, the first step positioned above the running board, and;
    a second step formed adjacent to the first step and comprised in an interior of the SUV, the second step positioned above the first step;
    wherein the first step is comprised in a first level of a second floor positioned above a first floor of the interior of the SUV and the second step is comprised in a second level of the second floor, the second level being a largest floor section of the interior of the SUV.

18. The side entry system of claim 17, further comprising an adjustable step movable between a storage position below the running board and an in-use position, wherein the adjustable step when in the in-use position comprises a third step positioned below the running board which is configured to assist an adult passenger make standing entry into the SUV through the rear passenger door.

19. A side entry system for a vehicle, comprising:
a first step proximate a rear passenger door of a vehicle;
a second step comprised in an interior of the vehicle, the second step positioned above the first step;
wherein the first step and the second step are configured to assist standing entry by an adult passenger into a passenger pod of the vehicle through the rear passenger door.

20. The side entry system of claim 19, wherein the vehicle comprises a four-wheel drive off-road sport utility vehicle (SUV) having at least four doors and having a ground clearance of 10.25 inches at a rear axle and 18 inches at a fuel tank when measured with no cargo and with no passengers.

* * * * *